(12) United States Patent
Hall (10) Patent No.: US 10,913,861 B2
(45) Date of Patent: Feb. 9, 2021

(54) PIPE AND PIPE SUPPORT PROTECTION PROCESS AND COMPOSITION THEREFOR

(71) Applicant: OXIFREE GLOBAL LIMITED, Frimley (GB)

(72) Inventor: Edward Hall, Spring, TX (US)

(73) Assignee: STOPAQ B.V., Stadskanaal (NL)

( * ) Notice: Subject to any disclaimer, the term of this patent is extended or adjusted under 35 U.S.C. 154(b) by 0 days.

(21) Appl. No.: 16/008,246

(22) Filed: Jun. 14, 2018

(65) Prior Publication Data

US 2018/0305560 A1    Oct. 25, 2018

Related U.S. Application Data

(60) Continuation-in-part of application No. 15/991,439, filed on May 29, 2018, which is a continuation-in-part
(Continued)

(51) Int. Cl.
| | |
|---|---|
| *B05D 1/02* | (2006.01) |
| *C09D 5/16* | (2006.01) |
| *C09D 5/08* | (2006.01) |
| *C09D 101/12* | (2006.01) |
| *C08K 5/00* | (2006.01) |
| *B05D 3/02* | (2006.01) |
| *F16L 58/04* | (2006.01) |
| *C08L 91/00* | (2006.01) |

(Continued)

(52) U.S. Cl.
CPC .............. *C09D 5/1656* (2013.01); *B05D 1/02* (2013.01); *B05D 3/0254* (2013.01); *C08K 5/0016* (2013.01); *C09D 5/08* (2013.01); *C09D 5/082* (2013.01); *C09D 5/086* (2013.01); *C09D 101/12* (2013.01); *F16L 58/04* (2013.01); *B05D 2254/02* (2013.01); *C08K 5/101* (2013.01); *C08L 91/00* (2013.01); *F16L 58/18* (2013.01)

(58) Field of Classification Search
None
See application file for complete search history.

(56) References Cited

U.S. PATENT DOCUMENTS

| | | |
|---|---|---|
| 2,956,103 A | 10/1960 | Steele et al. |
| 3,315,927 A | 4/1967 | Malloy et al. |

(Continued)

FOREIGN PATENT DOCUMENTS

WO    WO-2014175140 A1 * 10/2014 ............ C08F 230/08

*Primary Examiner* — Shamim Ahmed
*Assistant Examiner* — Bradford M Gates
(74) *Attorney, Agent, or Firm* — Egbert Law Offices, PLLC (57) ABSTRACT

A process and composition for coating a pipe and a pipe support includes mixing a cellulose acetate, a plasticizer, and an oil together so as to form a solid mixture, heating the solid mixture so as to form a liquid state, covering an area of the joinder of the pipe and the pipe support with the liquid state, and drying the liquid state on the area of the joinder. An ethylene-based polymer stabilizer is added to the mixture of the cellulose acetate, the plasticizer and the oil. The oil migrates by gravity from the liquid state from the covered pipe into an area of contact between the pipe and the pipe support. The liquid state is applied around the outer diameter of the pipe and over the outer surface of the pipe support underlying the outer diameter of the pipe.

9 Claims, 3 Drawing Sheets

Related U.S. Application Data of application No. 15/130,313, filed on Apr. 15, 2016, now Pat. No. 9,988,537, which is a continuation-in-part of application No. 15/040,445, filed on Feb. 10, 2016, now Pat. No. 9,657,180, which is a division of application No. 14/268,551, filed on May 2, 2014, now Pat. No. 9,267,040.

(60) Provisional application No. 61/821,844, filed on May 10, 2013.

(51) Int. Cl.
*C08K 5/101* (2006.01)
*F16L 58/18* (2006.01)

(56) References Cited

U.S. PATENT DOCUMENTS

| | | |
|---|---|---|
| 4,403,759 A | 9/1983 | Hicks |
| 4,428,893 A | 1/1984 | Cummings, Jr. et al. |
| 4,744,535 A | 5/1988 | Patenaude |
| 4,826,113 A | 5/1989 | Winters |
| 6,158,475 A | 12/2000 | Clemmer |
| 6,248,806 B1 * | 6/2001 | Codolar ............... C09D 5/1656 523/177 |
| 7,074,305 B2 | 7/2006 | Connors |
| 7,328,724 B2 | 2/2008 | Britton |
| 9,360,139 B1 | 6/2016 | Clement et al. |
| 2006/0046080 A1 * | 3/2006 | Keener ................... B05D 7/14 428/457 |
| 2007/0125451 A1 * | 6/2007 | Smith ................... C09D 5/084 148/247 |
| 2008/0305341 A1 * | 12/2008 | Plieth ................... B82Y 30/00 428/419 |
| 2015/0225571 A1 * | 8/2015 | Fink ....................... C09D 5/082 427/384 |
| 2016/0068688 A1 * | 3/2016 | Waku ..................... C09D 5/16 524/547 |
| 2016/0377197 A1 * | 12/2016 | Larsen ................... F16L 1/235 405/171 |

* cited by examiner

PIPE AND PIPE SUPPORT PROTECTION PROCESS AND COMPOSITION THEREFOR

CROSS-REFERENCE TO RELATED APPLICATIONS

The present application is a continuation-in-part application of U.S. patent application Ser. No. 15/991,439, filed on May 29, 2018, and entitled "Coating Composition and Method for the Protection of Complex Metal Structures and Components Use in Submerged Environments", presently pending. U.S. patent application Ser. No. 15/991,439 is a continuation-in-part of U.S. patent application Ser. No. 15/130,313, filed on Apr. 15, 2016, and entitled "Coating Composition and Method for the Protection of Complex Metal Structures and Components Used in Submerged Environments", presently pending. U.S. patent application Ser. No. 15/130,313 was a continuation-in-part of U.S. patent application Ser. No. 15/040,445, filed on Feb. 10, 2016 and entitled "Coating Composition for the Protection of Complex Metal Structures and Components Used in Submerged Environments", issued as U.S. Pat. No. 9,657,180 on May 23, 2017. U.S. patent application Ser. No. 15/040,445, was a divisional application of U.S. patent application Ser. No. 14/268,551, filed on May 2, 2014, and entitled "Coating Composition and Method for the Protection of Complex Metal Structures and Components Used in Submerged Environments", issued as U.S. Pat. No. 9,267,040 on Feb. 23, 2016. U.S. patent application Ser. No. 14/268,551 claimed priority from U.S. Provisional Patent Application Ser. No. 61/821,844, filed on May 10, 2013, and entitled "Coating System for the Protection of Complex Metal Structures in Submerged Environments".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the coating of metal structures. More particularly, the present invention relates to corrosion-proof coatings that can be sprayed upon pipes and pipe supports. Additionally, the present invention relates to a coating process for application to pipe and pipe supports so as to avoid corrosion in the area of the joinder of the pipe with the pipe support.

2. Description of Related Art Including Information Disclosed Under 37 CFR 1.97 and 37 CFR 1.98

Metallic structures that are exposed to the environment often become the victim of the effects of oxidization. This oxidization can cause the structures to degrade and, in some cases, completely lose structural integrity.

Figure 1:
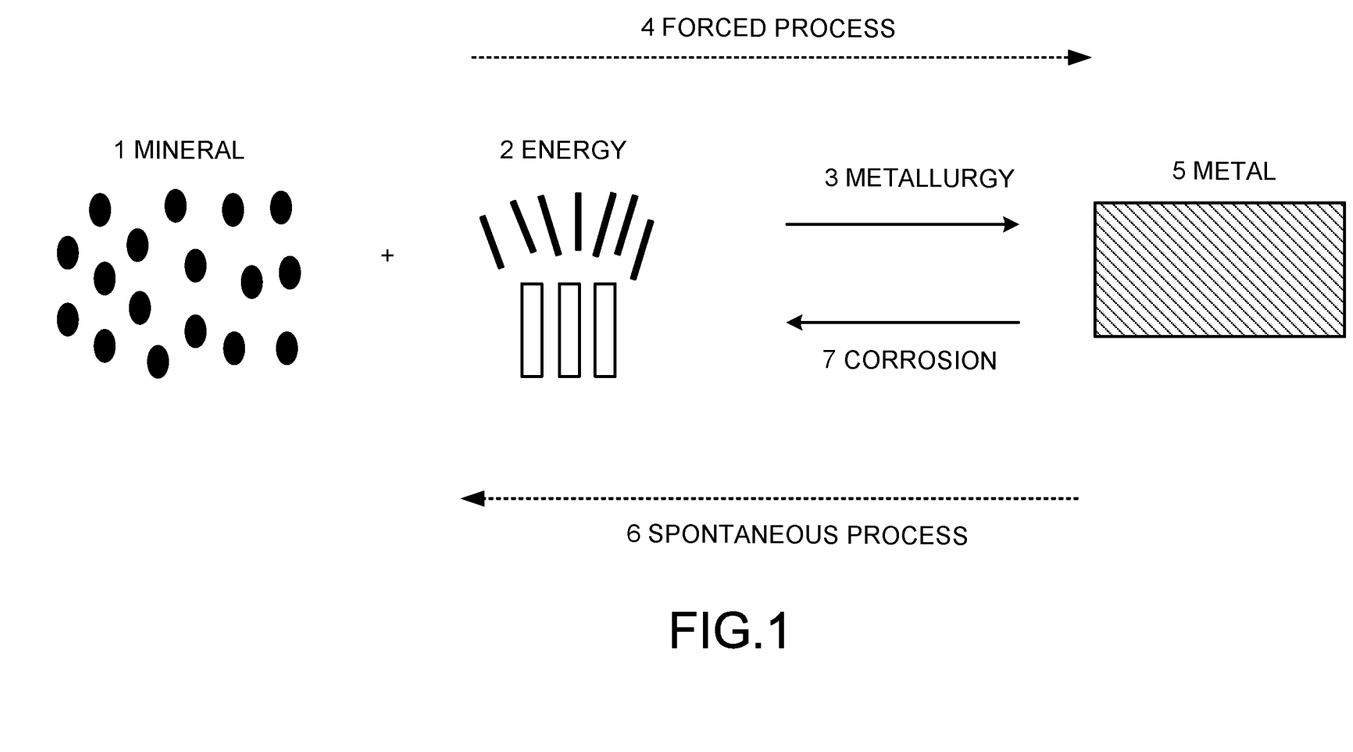
FIG. 1 is a diagram showing the various factors that create corrosion.
Figure 2:
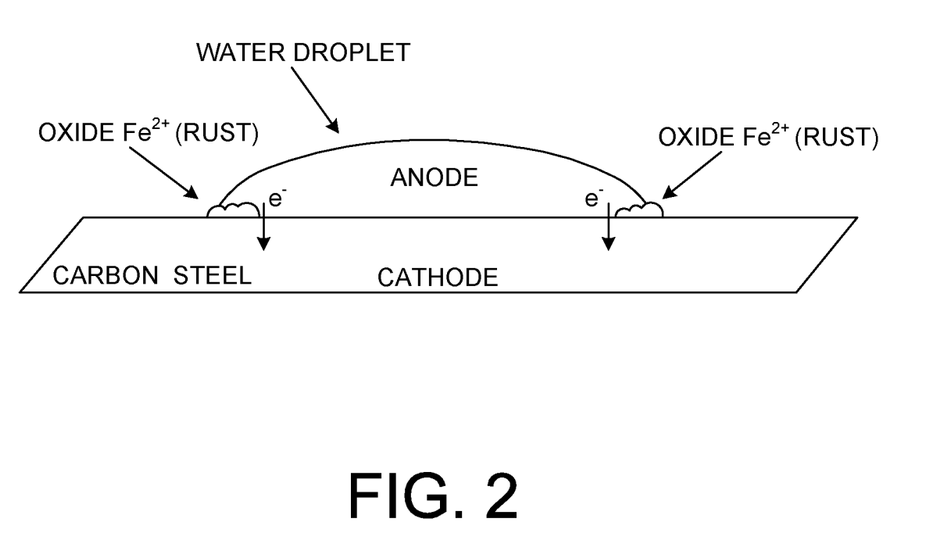
FIG. 2 is an illustration of the interface between the water droplet, the substrate and air.

The factors that can cause the degradation of metallic structures can include galvanic corrosion, environmental corrosion and chemical corrosion. FIG. 1 shows an illustration of the seven factors that can create corrosion. FIG. 2 illustrates the effects of oxidization at the interface between the water droplet, carbon steel and air. Ultimately, the oxidization will begin the reduction of the metal surface. An electron flow from the anode to the cathode actually occurs, as shown in FIG. 2. The metal or metals of a subsea structure can serve as anode, cathode, and the necessary metallic conductor between the anode and the cathode. Water provides the strong electrolyte that is required to complete the circuit of the cell. Such cells develop their driving force or electrical potential from differing conditions at the interface between metal and the electrolyte of the anode and cathode. These differences fall into three categories: (1) dissimilar metals comprising the anode and cathode; (2) inhomogeneity of a single metal which causes one area to be anodic to another area; and (3) inhomogeneity of the electrolyte.

In the past various processes have been used for protecting such metal structures. Galvanizing, powder coating, painting or other chemical or physical adaptation of the metals can occur during the production process. Corrosion control can also take place "in the field" as to prolong the life of metallic structures. The methods for corrosion protection tend to fail after a short period of time when the product is installed.

Generally, in order to eliminate corrosion, the basic rule of thumb is that is necessary to remove one element in the corrosion triangle in order to prevent corrosion. Generally, the application of coatings is utilized so as to achieve the removal of an element from the corrosion triangle. Unfortunately, coatings and paint have many disadvantages. Typically, coatings and paint will tend to degrade after only six months because of the porous nature of the coatings. It is also very labor intensive to remove or repair when in service. A great deal of time is required for conventional protective coatings since coatings need to be applied, cured, and dried. Many times, this time period can be in excess of eight hours. During this time period, moisture or other contaminants, have a chance to set and degrade the integrity of the coatings before they have dried. Many coatings contain harmful hydrocarbons and solvents, which can have an adverse ecological impact. Spreadable coatings generally create approximately 40% nonrecoverable waste at the point of application. Everyday damage to the paint or epoxy coating tends to create a failure to the integrity of the entire coating. As such, complete removal and re-application would be required. The removal of protective paint or epoxy coatings can actually be damaging to the surfaces they are intended to protect. Often, solid coatings will need to be removed by using solvents and abrasive tools or machinery. This can be damaging, costly, and can create hazardous waste. Generally, most protective coatings will need to be combined with other products in order to offer proper protection. Generally, painting and coatings will not work because the paint cannot cover or the seal crevices.

It is well-documented that corrosion under pipe supports is the second biggest issue of corrosion on external piping (after corrosion under insulation) in a wide range of industrial plants and offshore topside process piping. The issue is caused at the six o'clock position on the pipe. Such corrosion is very difficult to identify without close visual inspection or through the use of costly inspection equipment. It is not always safe or suitable to lift the pipe for inspection purposes due to the design of some clamps and supports that could result in a risk of damage and/or product release. This can cause certain safety issues.

A pipe support is usually made out of steel that provides a framework of a certain distance from the ground to support and distribute the weight of suspended pipes. They typically are made of certain structural steel items, such as I-beams, angle irons, and channel sections. These pipes are normally secured to the member using U-bolts. Also found in such facilities are either half or full saddle clamps, and welded supports, which allow movement of the pipe within the support. These types of supports also invite corrosion. These pipes can carry a variety of substances, such as water, gas, oil, chemicals, hydrocarbons, saltwater, fresh water, and others fluids that can flow through a pipe.

The environment is typically an aggressive one from a corrosion standpoint because of the exposure to water, chemicals, salt, humidity, and abrasions. Due to the shape and contours of the pipe support, these corrosion accelerants are easily trapped between the metal pipe and the support. This allows corrosion to develop. It is often very difficult to visually inspect this corrosion when the crevice corrosion begins.

There are many common solutions that are used to eliminate this problem of corrosion. These common solutions can actually aggravate the situation since they still allow for the accelerants to sit against the live pipework. Liners, rubber pads, and fiberglass pads, to name a few, have all failed. These types of solutions do not eliminate the water and corrosion effects.

Many solutions that are in the marketplace require a shutdown in order to install the solution. These types of shutdowns occur even when pipework is replaced, such as through the use of half-round plastic rods which minimize the contact point of metal-to-metal. In the best case scenario, the solutions are fitted at the outset of pipe installation.

Even during a shutdown, if the operator has not intended to replace the pipework, the operators are reluctant to remove the U-bolts, hangers, and clamps. They are reluctant to lift up pipe in order to install the solutions. This is because the operators do not wish to risk the possibility of damage to the pipework.

Under those circumstances where corrosion protection is retrofitted to existing pipes and pipe supports, cranes or other lifting equipment are required. As such, a site clearance is required. Repair equipment, blasting equipment, or other cleaning machinery are required. As a result, a multiple-man team is required. During the installation of corrosion-resistant structures, a lifting analysis may be required. A visual inspection for existing crevice corrosion is required in order to ensure that it is safe to lift. It may be necessary to carry out blasting area contamination/cleanup planning. This can be required along with a hectic shutdown period. As a result, this is resulted in extreme costs associated with the shutdown, the manpower planning, the lifting equipment required, and the inspection activities. As such, a need has developed to reduce the unnecessary expenditure and to make critical savings to maintenance, while increasing safety and reducing ecological impact. A need has developed to extend the asset lifespan without operational shutdown.

In the past, various patents have issued with respect to corrosion prevention associated with pipes and pipe supports. For example, U.S. Pat. No. 2,956,103, issued on Oct. 11, 1960 to Steel et al., describes an insulating pipe support for pipes in heating installation. This pipe support includes a base member formed of an electrical insulating material and having an upwardly facing projection formed integrally therewith and a strap member having a U-shaped portion facing the base member. The pipe is supported within the strap and the base member and loosely fitted with respect to the projections. An insert is in frictional contact with the outer surface of the pipe and has a resistance sufficient to prevent electrolytic corrosion but insufficient to allow the buildup of static electricity.

U.S. Pat. No. 3,315,927, issued on Apr. 25, 1967 to Malloy et al., teaches a corrosionless pipe slide support. This pipe support includes a first plate member and a second plate member. The first flat surface of the first plate member is arranged in slidable contact with a first flat surface of the second plate member. A second arcuately depressed surface of the first plate member is adapted to be in contiguous contact with a supported pipe. A second surface of the second plate member is adapted to be in contiguous contact with a structure adapted to bear a load imposed thereon by the supported pipe and the slidable support. The plate members are formed of a carbon material.

U.S. Pat. No. 4,403,759, issued on Sep. 13, 1983 to C. F. Hicks, describes a cathodic corrosion-resistant pipe saddle with a low-friction insert. The pipe saddle has a pipe-supporting cradle connected to a base portion by a web. The base portion includes flanges and is adapted to slidably rest on a supporting surface. Brackets mounting the flanges to the supporting surface permit the saddle to slide between the supporting surface and the brackets in the direction of the axis of the supported pipe, but restrict motion in all other directions. A relatively low-coefficient of friction element is removably inserted in a cavity formed in the bottom of the base portion and extends below the bottom surface to engage the supporting surface.

U.S. Pat. No. 4,428,893, issued on Jan. 31, 1984 to Cummings et al., provides a saddle-type pipe support attachable to a base. The support is comprised of an inverted V-shaped member, a sling support located at the vertex of the inverted V-shaped member for engagement of a pipe to the support, and a clamp for securing the pipe to the sling. The leg elements of the inverted V-shaped member include a foot on each element for engagement with a base.

U.S. Pat. No. 4,744,535, issued on May 17, 1988 to T. A. Patenaude, discloses a pipe seat positionable between a portion of a pipe and a surrounding pipe support structure. When properly positioned, the seat is constructed to cradle the pipe, isolate the pipe from the pipe support structure, and inhibit the collection of corrosive material on the pipe in the vicinity of the pipe support. The seat has a generally arc-shaped member having a plurality of channels in both its top surface and its bottom surface which are sufficient to facilitate airflow about the pipe and its surrounding support structure.

U.S. Pat. No. 4,826,113, issued on May 2, 1989 the R. E. Winters, discloses a pipe type support assembly which allows limited slippage of the pipe support between the supported pipe and the supporting beam to the extent that part of the pipe in contact with the pipe support becomes exposed for inspection and maintenance purposes.

U.S. Pat. No. 6,158,475, issued on Dec. 12, 2000 to D. G. Clemmer, provides an underground pipe support device for supporting an underground carrier pipe within an outer encasement of a horizontally-bored hole between a highway or railroad bed. The pipe support is an annular ring structure comprised of two semicircular clamping members which each terminate in outwardly extending flange. The opposite ends of each semicircular clamp section are joined by a band extending across the juncture thereof to provide pivoting movement from an open position to a closed position of the pipe support.

U.S. Pat. No. 7,074,305, issued on Jul. 11, 2006 to G. W. Connors, provides a pipeline support for reducing corrosion on a pipeline surface. This pipeline support includes a support fill material and a case for housing the support fill material. When a cathodic protective current contacts the support, the current flows through the support to the pipeline surface to reduce corrosion on the surface.

U.S. Pat. No. 7,32,824, issued on Feb. 12, 2008 to J. Britton, provides a corrosion-inhibiting liner for a pipe support. This liner includes a flexible mat containing spaced-apart slots and a cylindrically-curved buffer in tight engagement with the mat in each slot. The cylindrically-cover curved buffer is made of a non-metallic, non-elastomeric material that can withstand a compressive strength of at least 8000 p.s.i. and has a friction coefficient of less than 0.35.

U.S. Pat. No. 9,360,139, issued on Jun. 7, 2016 to Clement et al., teaches a non-corrosive low-friction pipe support. This pipe and pipe support interface structure has a fiberglass C-shaped bearing surface saddle structure having a high-strength, low-friction, non-corrosive bearing surface block of a polymer material. The bearing surface saddle structure is adhesively bonded to the exterior surface of the pipe following appropriate pipe surface preparation at locations where the pipe contacts a pipe support structure. The bearing surface block of the bearing support structure provides an interface between the pipe and the pipe support surface in order to protect the pipe from wear caused by bearing on the pipe support.

It is an object of the present invention to provide a process and composition which does not require a lifting of the pipe from the pipe support in order to install the pipe protection.

It is another object of the present invention to provide a process and composition which does not require removal of clamps from the pipe and the pipe support.

It is another object of the present invention to provide a process and composition that requires minimal surface preparation prior to installation.

It is another object of the present invention to provide a process and composition that effectively prevents corrosion in the area of the joinder of the pipe with the pipe support.

It is another object of the present invention to provide a process and composition which accommodates movement of the pipe on the pipe support due to thermal expansion, thermal contraction or vibration.

It is another object of the present invention provide a process and composition which reduces friction between the pipe and the pipe support.

It is another object of the present invention to provide a process and composition that avoids ingress of external contaminants.

It is another object of the present invention provide a process and composition which avoids the shutdown of processes carried out within the pipe.

It is another object of the present invention to provide a process and composition which effectively protects pipes and pipe supports from corrosion which requires minimal labor and time.

It is still a further object of the present invention provide a process and composition which facilitates the ability to inspect the area between the pipe and the pipe support.

These and other objects and advantages of the present invention will become apparent from a reading of the attached specification and appended claims.

BRIEF SUMMARY OF THE INVENTION

The present invention is a process for coating a pipe and a pipe support including the steps of: (1) mixing a cellulose acetate, a plasticizer, and an oil together to form a solid mixture; (2) heating the solid mixture so as to form a liquid state; (3) covering an area of a joinder of the pipe and the pipe support with the liquid state; and (4) drying the liquid state on the area of the joinder.

In the present invention, the pipe can have a clamp extending therearound. The method further includes covering the clamp with the liquid state, and then drying the liquid state on the clamp. The surface of the pipe and the pipe support should be cleaned at the area of the joinder prior to the step of covering.

In the process of the present invention, an ethylene-based polymer stabilizer is added to the mixture of the cellulose acetate, the plasticizer and the oil. In particular, the plasticizer is a epoxidized oil. The oil is canola oil and/or epoxidized soybean oil. The ethylene-based polymer stabilizer is a low-density polyethylene that carries a pigment. In an embodiment of the present invention, the cellulose acetate is approximately 48% by weight of the total weight of the composition. The epoxidized linseed oil is approximately 20% by weight of the total composition. The canola oil is approximately 23% by weight of the total composition. The soybean oil is approximately 8% by weight of the total composition. The pigment that is carried by the ethylene-based polymer stabilizer is carbon black and titanium dioxide. The low-density polyethylene will be approximately 1 to 2% by weight of the total composition.

In the method of the present invention, the step of heating includes heating the solid mixture to a temperature of at least 160° C. The step of covering includes spraying the liquid state onto the area of the joinder of the pipe and the pipe support. In particular, two coats of the liquid state is sprayed onto the area of the joinder of the pipe and the pipe support. The step of drying includes drying the liquid state on the area of the joinder for a period of time of less than five minutes.

The oil migrates by gravity from the liquid state on the covered pipe into an area of contact between the pipe and the pipe support. The liquid state is applied around the outer diameter of the pipe and over an outer surface of the pipe support underlying the outer diameter of the pipe.

The present invention is also a coating composition for application to an area of a joinder of a pipe with a pipe support. This coating composition comprises a cellulose acetate, a plasticizer, an oil, and an ethylene-based polymer stabilizer. The plasticizer, the cellulose acetate, the oil, and the ethylene-based polymer stabilizer are mixed together.

In an embodiment of this coating composition, the plasticizer is epoxidized linseed oil. The ethylene-based polymer stabilizer is a low-density polyethylene. This low-density polyethylene has a pigment carrier therein. The oil is selected from the group consisting of canola oil, soybean oil, and a mixture of canola oil and soybean oil. In particular, the composition of the present invention, the cellulose acetate is approximately 48% by weight of the total composition. The plasticizer is approximately 20% by weight of the total composition. The oil is approximately 31% by weight of the total composition. The ethylene-based polymer stabilizer is between approximately 1 and 2% by weight of the total composition.

In the process and composition of the present invention, the present invention is able to encapsulate any form of pipe-on-pipe support design and arrest existing corrosion to the assembly, as well as providing a long-term barrier to future corrosion. In particular, in the process of the present invention, the pipe does not require lifting away from the pipe support and clamps pipe support. Clamps do not need to be removed in order to perform the protection process. The pipeline process can be remain operational throughout the entire installation process. Minimal surface preparation is required. In particular, the pipe and the pipe support can be cleaned with standard handtools, followed by decreasing and removing moisture by using compressed air. The composition is applied across all areas of the assembly, inclusive of the pipe, the pipe support and any clamping device that is present. The composition is pre-impregnated with corrosion-inhibiting oil so as to provide various benefits to protection against a complex corrosion issue, such as corrosion under pipe supports. The oil provides lubrication to any bolted assembly, as well as to the point of contact between the pipe and the pipe support. This helps the pipe to move on or in the support (due to thermal expansion, thermal contraction and vibration) for reducing friction and thus reducing damage. The oil is an active corrosion inhibitor which will arrest existing corrosion. The oil forms a membrane between the outer polymer in the metal substrates and provides an additional barrier against ingress of external contaminants (i.e. moisture and oxygen), thus adding additional resistance beyond the polymer for long-term corrosion protection. The oil exudes slowly onto the metal substrate. In particular, gravity works with the oil by pulling it downwardly around the pipe so as to deposit the protective membrane around all that is encapsulated and especially depositing a large reservoir at the bottom of the pipe and on top of the pipe support.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

The polymeric coating composition of has a variety of components. In particular, the components of the coating composition of the present invention include a cellulose acetate, a plasticizer, an oil, and an ethylene-based polymer stabilizer. The cellulose acetate, the plasticizer, the oil, and the ethylene-based polymer stabilizer are mixed together so as to form a solid mixture. The solid mixture is heated so as to form a liquid state. An area of the joinder of the pipe and the pipe support are covered with the liquid state. The liquid state is then dried in this area of the joinder of the pipe with the liquid state.

Particularly, in one form of the present invention, the plasticizer is an epoxidized linseed oil. The oil can be canola oil, soybean oil, or a mixture thereof. The cellulose acetate is approximately 48% by weight of the total composition. The plasticizer is approximately 20% by weight of the total composition. The oil is approximately 31% by weight of the total composition. In particular, where the oil is canola oil and soybean oil, the soybean oil would be epoxidized soybean oil which is approximately 8% by weight of the total composition and the canola oil is approximately 23% by weight of the total composition. The ethylene-based polymer stabilizer is a low-density polyethylene the carries a carbon black and titanium dioxide pigment. The ethylene-based polymer stabilizer is approximately 1% to 2% by weight of the total composition.

The method of the present invention serves to apply a coating to an area of a joinder between the pipe and a pipe support. In particular, in this method, the cellulose acetate, the plasticizer and the oil are mixed together so as to form a solid mixture prior to application to the area of joinder. The solid mixture is then heated to form a liquid state of the composition. The area of the joinder between the pipe and the pipe support is then covered with the liquid state. The liquid state is then dried in the area of the joinder of the pipe and the pipe support. The ethylene-based polymer stabilizer having a pigment therein is added during the step of mixing of the cellulose acetate, the plasticizer and the oil. In particular, the plasticizer is epoxidized linseed oil. The oil is canola oil and/or epoxidized soybean oil. The ethylene-based polymer stabilizer is low-density polyethylene and is approximately 1 to 2% by weight of the total weight of the solid mixture. The ethylene-based polymer stabilizer carries a pigment therein. In the preferred embodiment of the present invention, the pigment is carbon black and titanium dioxide. The cellulose acetate will be approximately 48% by weight of the total weight of the solid mixture. The epoxidized linseed oil approximately 20% by weight of the total weight of the solid mixture. The canola oil is approximately 23% by weight of the total weight of the solid mixture. The epoxidized soybean oil is approximately 8% by weight of the total weight of solid mixture.

In particular, the solid mixture is heated to a temperature of at least 160° C. It is desirable that the solid mixture be heated to a temperature between 160° and 170°. The liquid state is then sprayed onto the area of the joinder of the pipe and the pipe support. Two coats of the sprayed liquid state is applied to the area of the joinder of the pipe and the pipe support. After spraying, the liquid state is dried onto the area of the joinder of the pipe and the pipe support for a period of time of less than five minutes.

This composition provides a unique sprayable coating system that can be applied to address a wide range of corrosion issues associated with pipes and pipe supports. The present invention overcomes the shortcomings of existing corrosion control techniques in order to provide a reliable and sustainable solution. The composition is a standalone product. It does not have to be used with other products in order to get the proper results.

The composition of the present invention provides a significant longevity of protection. It is believed that the composition can provide protection for over ten years. The composition is easily and quickly applied, dries very rapidly, is removable, is reusable, and also is ecologically safe. Damage to the applied composition can be repaired in the field very easily at the point of damage. All that is necessary is to remove the damaged material and reapply the composition to the damaged area. The composition will adhere to itself since the material is applied in a molten state. This composition, once applied, can be removed with a knife by hand. As such, potential damage to the pipe and the pipe support is avoided. There is no need for expensive ancillary equipment. As such, the present invention provides a very time-efficient process. Importantly, when applied to the pipe and the pipe support, the composition becomes flexible, impact-resistant and corrosion-resistant. The flexibility facilitates the ability of the composition to better adhere to and distribute forces to the pipe and the pipe support.

The composition of the present invention is a solid product at ambient temperatures below 160° C. As such, heat is required to melt the solid product to a liquid state. Once in a liquid state, the composition of the present invention can be applied to the metallic surfaces. Once the liquid composition of the present invention makes contact with the surface, this composition will take the form of the shape of the surface and drive very rapidly so as to provide a protective cocoon. Within this cocoon, there are active corrosion-inhibiting agents which create a membrane layer between the substrate and the protective coating. This membrane layer it eradicates any further surface corrosion as well as ensures that foreign contaminants cannot ingress under the encapsulation. Once the composition is used on the pipe and the pipe support, the inhibiting oils penetrate by gravity toward the pipe and the pipe support and, in particularly, flow by gravity from the composition that is applied to the pipe downwardly into the area of the area of contact between the pipe and the pipe support.

Figure 3:
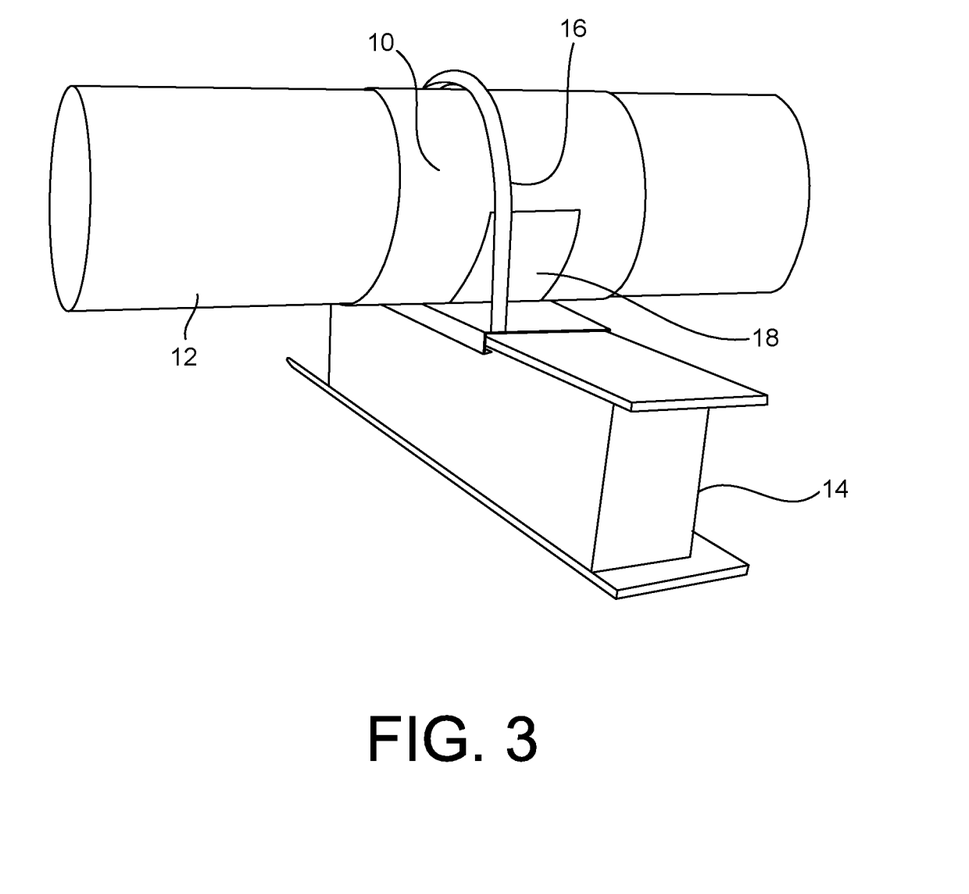
FIG. 3 is a perspective view of the pipe and pipe support in which the composition is applied around the outer diameter of the pipe and onto the area of the joinder between the pipe and the pipe support.

With reference to FIG. 3, it can be seen that the coating 10 is applied to the pipe 12 and to the pipe support 14. There is a clamp 16 that extends around the outer diameter of the pipe 12. The coating composition 10 is also applied around the exterior of the clamp 16 while the clamp 16 remains secured around the pipe 12 in secured to the pipe support 14.

In FIG. 3, the pipe support 14 is an I-beam. A wide variety of other pipe supports are contemplated within the concept of the present invention. The pipe support 14 is only one form of a pipe support that can be used in association with the present invention. A portion 18 of the coating composition 10 is applied to the upper surface of the pipe support 14 in the area of the joinder between the pipe 12 and the pipe support 14. It can be seen that the coating composition 10 extends entirely around the outer diameter of the pipe 12 and over the outer surfaces of the clamp 16. As such, the coating composition 10 completely encapsulates the pipe and the pipe support in those areas where corrosion can persist. As described herein previously, the inhibitor oil will migrate to the portion 18 of the coating composition 10 at the six o'clock position of the pipe 12 and in those areas of the pipe support 14 that contact the pipe 12. As such, this oil will generally flow into those crevices and hard-to-reach areas between the pipe 12 and the pipe support 14. The portion 18 of the composition 10 should generally be applied onto the pipe support 14 below the pipe 12 at least below the outer diameter of the pipe 12. The oil inhibitor flows so as to form an inner layer which is in contact with the outer surfaces of the pipe 12 and the outer surfaces of pipe support 14. The polymeric resin is on the outside of the composition 14 and acts as a passive protection. The polymeric resin in the coating composition 10 will encapsulate the pipe 12 and avoid the ingress of suspended particles, water, air, sea water, and other corroding chemicals.

This flexible coating composition only creates adhesion through encapsulation. As such, the coating composition can be removed from the pipe 12 and the pipe support 14 in small portions or removed as a whole with a knife in a matter of seconds. Another advantage of the composition of the present invention is that there is no surface adhesion. As such, the composition of the present invention can compensate for movement occurring as a result of thermal expansion, thermal contraction, or vibration between the pipe support 14 and the pipe 12. The economic advantages of the present invention are apparent when compared with other structural corrosion-protection techniques. The composition of the present invention only requires minimal surface preparation prior to application. The surface protection can include the use of standard hand tool cleaning procedures, followed by degreasing, desalting, and removal of moisture by using compressed air. The composition of the present invention does not create any waste during the application process. The application-to-dry time is ½₀ the cure time for most paint-type coatings. Only one coating of the composition of the present invention is necessary. The coating composition of the present invention has a drying time of less than five minutes. As such, the present invention is able to provide protection very quickly. There is no need to apply a primer, as is in the case of a paint coating. Ultimately, with paint coatings, several coatings of paint are required in order to provide the necessary protection. This can take in excess of two hours to cure per coat. The composition of the present invention can be removed entirely from the pipe and the pipe support and then melted down and reused during the initial application. The composition of the present invention does not have a hazard classification for transport or disposal. As such, the present invention or avoids any expensive disposal costs.

Due to the active nature of the composition of the present invention, along with its ability to retain flexibility, the material can expand and contract along with the pipe and the pipe support that it is protecting. Many other corrosion control techniques and products do not have sufficient elasticity or flexibility. As such, this could cause prior art composition to perish and crack, especially when subjected the large temperature variations. Since the composition of the present invention is applied to the exterior surfaces of the pipe and the pipe support, there is no need to shut down the process within the pipe during application.

The foregoing disclosure and description of the invention is illustrative and explanatory thereof. Various changes in the described method or composition can be made within the scope of the present claims without departing from the true spirit of the invention. The present invention should only be limited by the following claims and their legal equivalents.

I claim:

1. A process for coating a pipe and a pipe support, the process comprising:
   mixing a cellulose acetate, a plasticizer and an oil together so as to form a solid mixture, the plasticizer being an epoxidized linseed oil, the oil being a canola oil and an epoxidized soybean oil;
   adding an ethylene-based polymer stabilizer during the step of mixing, the ethylene-based polymer stabilizer being a polytheylene that carries a pigment;
   heating the solid mixture so as to form a liquid state;
   covering an area of a joinder of the pipe and the pipe support with the liquid state; and
   drying the liquid state on the joinder.

2. The process of claim 1, the cellulose acetate being approximately 48% by weight of the total composition, the epoxidized linseed oil being approximately 20% by weight of the total composition, the canola oil being 23% by weight of the total composition, the soybean oil being approximately 8% by weight of the total composition.

3. The process of claim 1, the pigment being carbon black and titanium dioxide, the polyethylene being approximately 1 to 2% by weight of the total composition.

4. The process of claim 1, the step of heating comprising:
   heating the solid mixture to a temperature of at least 160° C.

5. The process of claim 1, the step of covering comprising:
   spraying the liquid state onto the area of the joinder of the pipe and the pipe support.

6. The process of claim 5, the step of spraying comprising:
   spraying at least two coats of the liquid state onto the area of the joinder of the pipe and the pipe support.

7. The process of claim 1, the step of drying comprising:
   drying the liquid state on the area of the joinder for a period of time of less than five minutes.

8. A process for coating a pipe and a pipe support, the process comprising:
   mixing cellulose acetate, a plasticizer and an oil to form a solid mixture;
   heating the solid mixture so as to form a liquid state;
   covering an area of a joinder of the pipe and the pipe support with the liquid state;
   migrating the oil by gravity from the liquid state from the covered pipe into an area of contact between the pipe and the pipe support; and
   drying the liquid state on the joinder.

9. The process of claim 8, the step of covering comprising:
   applying the liquid state around an outer diameter of the pipe and over an outer surface of the pipe support underlying the outer diameter of the pipe.

* * * * *